W. B. GOULD.
CORNER-CLASPS FOR TRUNKS.
No. 171,374. Patented Dec. 21, 1875.
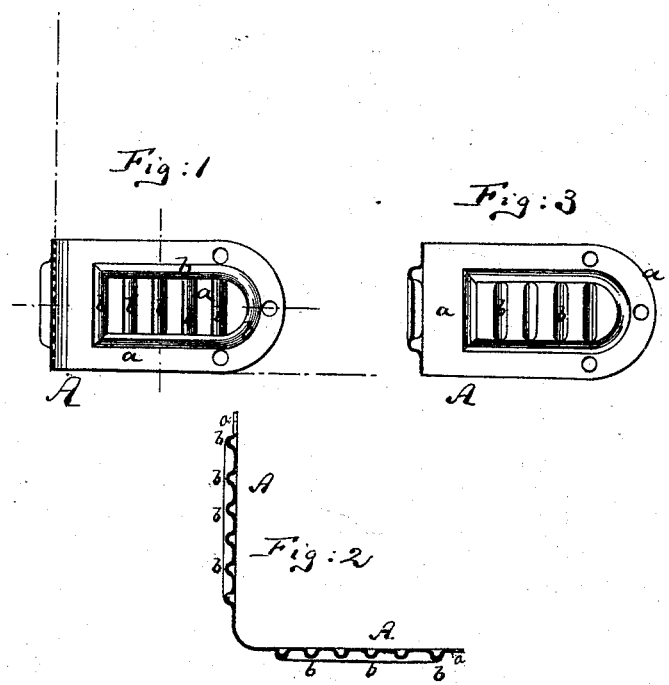
Witnesses:
A. Moraga
E. C. Webb
Inventor
Wm. B. Gould
by his attorney
A. v. Briesen

UNITED STATES PATENT OFFICE.

WILLIAM B. GOULD, OF MONTROSE, NEW JERSEY.

IMPROVEMENT IN CORNER-CLAMPS FOR TRUNKS.

Specification forming part of Letters Patent No. 171,374, dated December 21, 1875; application filed July 17, 1875.

*To all whom it may concern:*

Be it known that I, WILLIAM B. GOULD, of Montrose, in the county of Essex and State of New Jersey, have invented a new and Improved Corner-Clamp for Trunks, of which the following is a specification:

Figure 1 is a face view, Fig. 2 a horizontal section, and Fig. 3 a cross-section, of my improved corner-clamp.

Similar letters of reference indicate corresponding parts in all the figures.

This invention has for its object to produce a corner-clamp for trunks; and consists in corrugating the wings thereof, leaving the corner portion quite straight and flat.

In the drawing, the letter A represents my improved corner-clamp. The same is made of sheet metal, or of malleable or other metal, of suitable size, and has its wings *a a* corrugated to form hollow grooves in their inner faces, and projecting ribs *b b* on their outer faces. These ribs terminate some distance from the corner and from the ends of the clamp, leaving the corner and the ends quite straight on the inner and outer side, and so that they will rest flush against the body of the trunk.

A clamp thus made, when applied to a trunk by nails or screws that extend through holes in the wings, will protect the sides and ends of the trunk against contact with other articles, and may be made lighter than, and will still be fully as strong as, the corner-clamps which are made bulging at the corners and flat at the wings.

In my clamp the corrugation in each wing is braced at both of its ends by the flat part of the wing, which is not the case in any other trunk-clamp, and which is the cause of the comparatively greater strength of my clamp.

I claim as my invention and desire to secure by Letters Patent—

The improved corner-clamp A, made with corrugated wings *a a*, and with a flat and plain corner that will rest flush against the body of the trunk, substantially as specified.

W. B. GOULD.

Witnesses:
  E. C. WEBB,
  F. V. BRIESEN.